E. E. BIDWELL.
INTERNAL COMBUSTION ROTARY ENGINE.
APPLICATION FILED MAY 1, 1920.
1,427,053.
Patented Aug. 22, 1922.
4 SHEETS—SHEET 1.
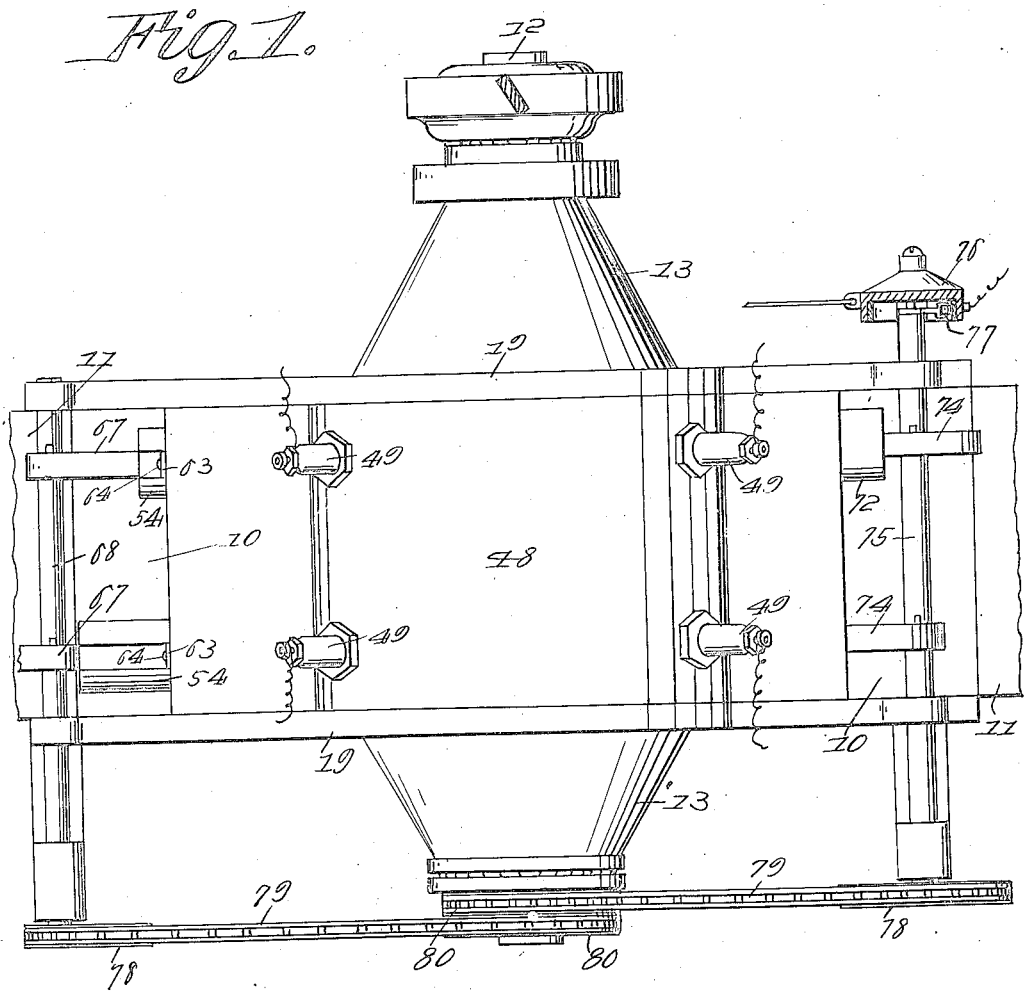
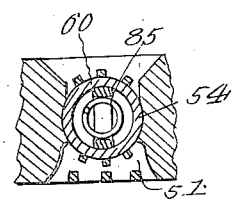

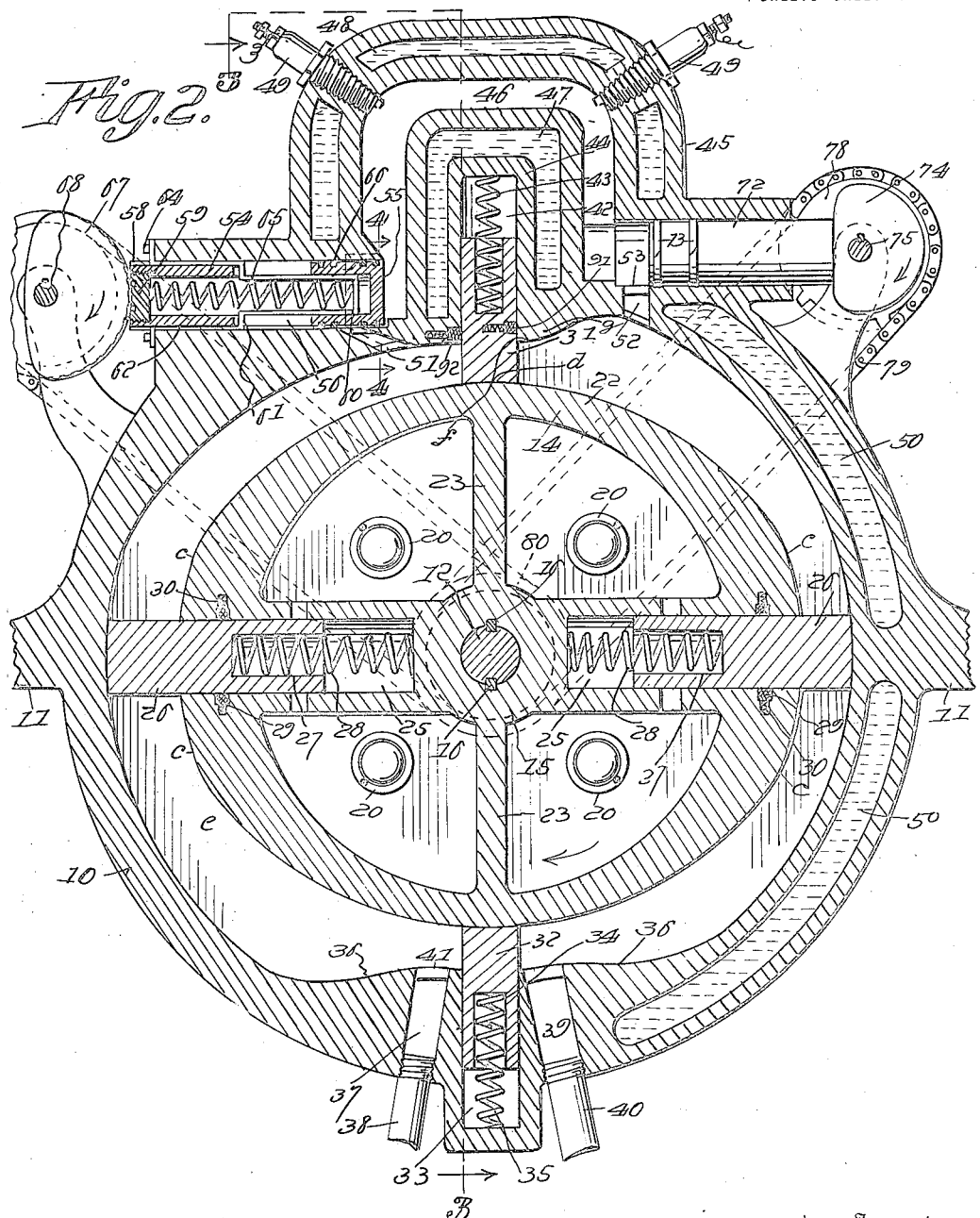

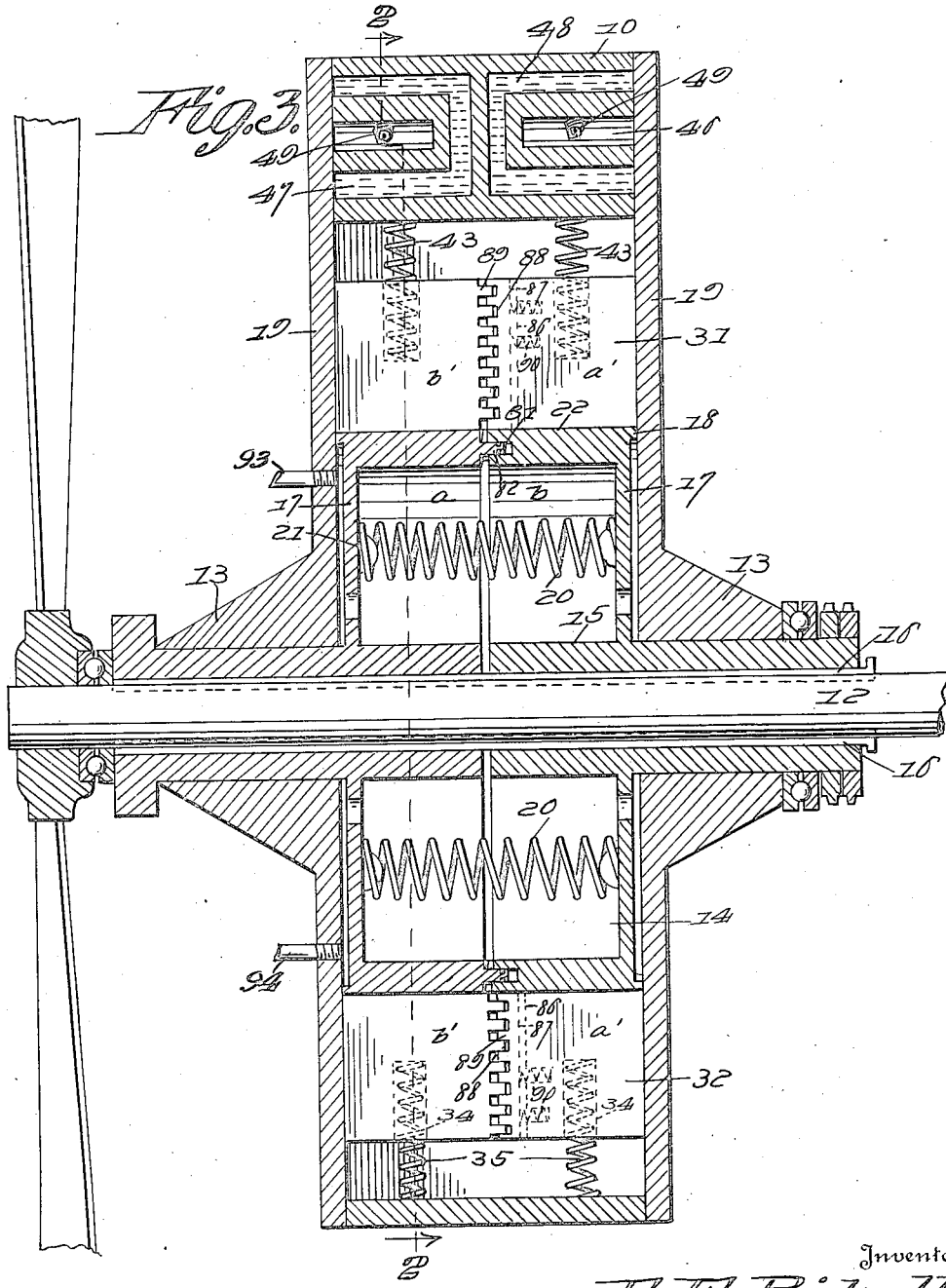

E. E. BIDWELL.
INTERNAL COMBUSTION ROTARY ENGINE.
APPLICATION FILED MAY 1, 1920.
1,427,053. Patented Aug. 22, 1922.
4 SHEETS—SHEET 4.
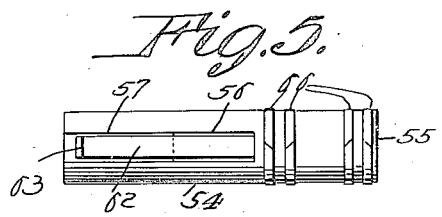
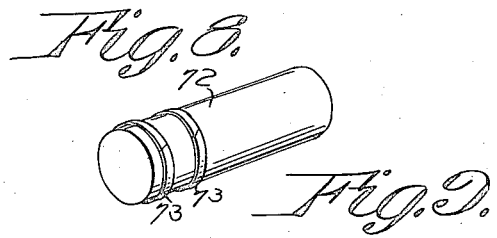
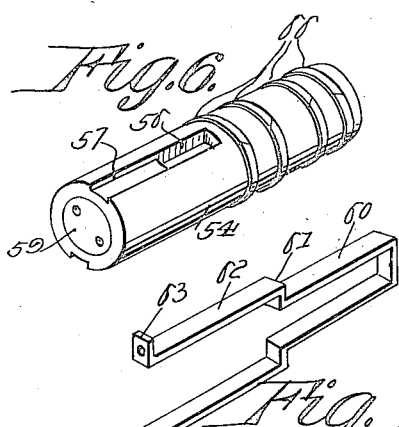
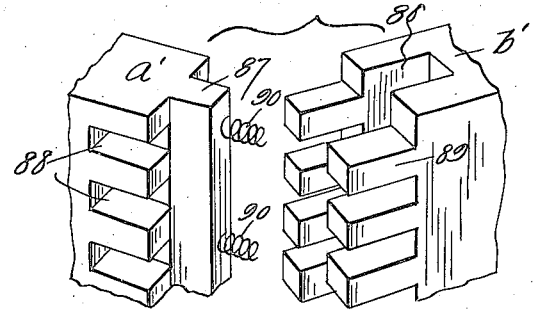
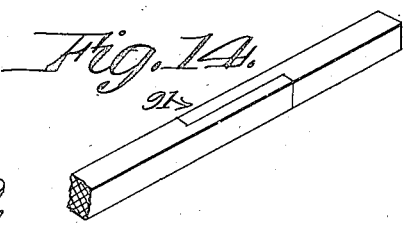
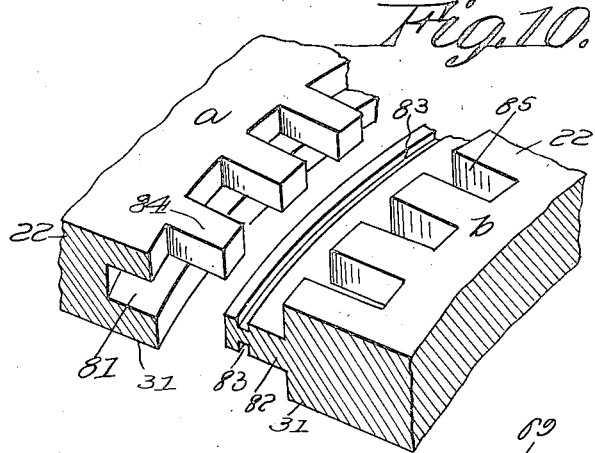
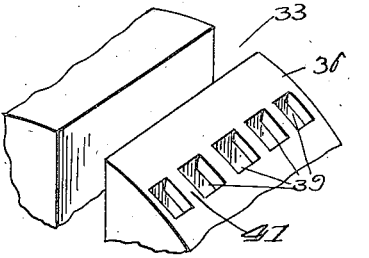
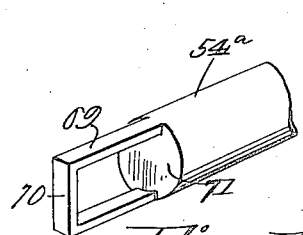
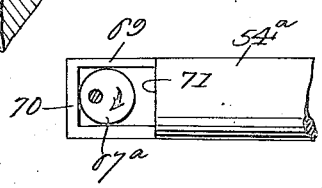
Inventor
E. E. Bidwell,
By Watson E. Coleman
Attorney

UNITED STATES PATENT OFFICE.

EARL E. BIDWELL, OF FREDERICK, OKLAHOMA, ASSIGNOR OF FORTY-FIVE ONE-HUN-
DREDTHS TO PRICE QUESENBERRY, OF FREDERICK, OKLAHOMA.

INTERNAL-COMBUSTION ROTARY ENGINE.

1,427,053.      Specification of Letters Patent.      Patented Aug. 22, 1922.

Application filed May 1, 1920. Serial No. 378,316.

*To all whom it may concern:*

Be it known that I, EARL E. BIDWELL, a citizen of the United States, residing at Frederick, in the county of Tillman and State of Oklahoma, have invented certain new and useful Improvements in Internal-Combustion Rotary Engines, of which the following is a specification, reference being had to the accompanying drawings.

This invention relates to rotary engines, and particularly to internal combustion rotary engines.

The general object is to provide an internal combustion rotary engine which is simple and effective, and wherein the gaseous fuel is compressed on one side of the rotor and forced into an explosion chamber, wherein it is exploded, the expanding gases acting on the other side of the rotor.

A further object is to provide a mechanism of this character wherein the explosion chamber is provided with two ports leading into the casing of the rotor on each side of the medial abutment thereof, the inlet and outlet of the gases to and from the explosion chamber being controlled by valves of such character that they will not be affected in any manner by the back pressure generated within the explosion chamber, and in this connection to provide a structure of this character having sliding piston valves of peculiar construction, the valves controlling the passage of the expanding gases into the rotor chamber being of such construction that these valves are opened by the pressure of the expanding gases, while resistance to the opening movement of the valves is secured by cams bearing against the ends of the valves.

A further object is to provide a construction of this character wherein a timer is disposed upon the cam shaft controlling the outlet of gases from the combustion chamber so that the explosion of the gases may be accurately timed with relation to the opening of the valve leading from the combustion chamber into the rotor casing.

A further object is to provide an improved form of piston valve and cam for the purpose of controlling the inlet of the gases being compressed into the combustion chamber.

Another object is to provide a rotary engine of this character having two adjacent combustion chambers, in one of which the gas is being compressed, while the gas in the other is being exploded.

Still another object is to provide an improved form of rotor of such construction as to secure a gas-tight engagement with the walls of the rotor casing so as to prevent any loss of power.

Another object is to provide an engine of this character wherein the chamber surrounding that portion of the rotor wherein the gases are admitted to be carried into and compressed within the combustion chamber is of larger cross sectional area than the space surrounding the rotor into which the ignited gases expand.

Still another object is to provide means for thoroughly lubricating the rotor, valves, the piston blades and the abutment blades.

Another object is to so construct the rotor and the casing that the piston blades of the rotor and the abutment blades of the casing will readily pass each other, and these blades will have but a minimum of movement in order to pass each other, and in this connection to provide means whereby there shall be no pocketing of the gas at the time that the piston blade is approaching and passing the abutment between the inlet and the explosion side of the rotor.

Other objects objects will appear in the course of the following description.

My invention is illustrated in the accompanying drawings, wherein:—

Figure 1 is a top plan view of a rotary engine constructed in accordance with my invention;

Figure 2 is a section on the line 2—2 of Figure 3, looking in the direction of the arrows;

Figure 3 is a section on the line 3—3 of Figure 2;

Figure 4 is a section on the line 4—4 of Figure 2;

Figure 5 is an elevation of one of the valves controlling the inlet of fuel to the combustion chamber;

Figure 6 is a perspective view of the valve shown in Figure 5;

Figure 7 is a perspective view of the yoke used with this valve;

Figure 8 is a perspective view of the valve controlling the outlet of ignited expanding gases from the combustion chamber;

Figure 9 is a fragmentary perspective view showing the joint between the two sections of the piston blades;

Figure 10 is a fragmentary sectional view of the joint between the two sections of the rotor;

Figure 11 is a fragmentary perspective view of a portion of the rotor casing showing the space for one of the abutment blades and showing the manner in which the ports are formed;

Figure 12 is a perspective view of a modified form of the valve for controlling the inlet of fluid to the combustion chamber;

Figure 13 is a side elevation of the valve shown in Figure 12 and showing the cam whereby the valve is actuated;

Fig. 14 is a perspective view of the spring actuated packing strip in the face of the upper sliding abutment shown in Fig. 2.

This invention has been particularly designed with reference to aeroplanes and like machines, and I have illustrated, therefore, the engine as being adapted for this purpose, though it is to be understood that the engine might be provided with a base and used as a stationary engine or as a means for propelling automobiles or the like.

Referring to these drawings, 10 designates the rotor casing, which is shown as provided with the lateral flanges 11 whereby the casing may be supported upon the longerons or other engine supporting beams of a flying machine, or upon the longitudinal frame beams of an automobile. The casing 10 is cylindrical exteriorly and approximately concentric to a longitudinal shaft 12, the casing being provided with hub-like portions 13 at opposite sides. Disposed within the casing is the rotor, designated generally 14, which rotor is formed in two sections, each section being provided with a sleeve-like portion 15 constituting the hub of the section and having rotative engagement with the shaft 12. I have illustrated these sleeve-like hubs 15 as being engaged with the shaft 12 by means of a plurality of longitudinally extending keys 16 extending through keyways formed in the shaft 12 and keyways formed in the sleeve-like portions 15. I do not wish to be limited to this, however, as it is obvious that any means may be provided which will permit the rotor to have rotative engagement with the shaft 12 and at the same time permit the rotor sections to have slight sliding movement on the shaft, for reasons which will be hereafter stated.

The rotor, as previously stated, is formed in two sections $a$ and $b$. These sections are alike in form and each section is provided with an end wall or web 17 which engages with and may be formed in one piece with the sleeve section 15. These webs 17 may be, and preferably are, perforated or skeletonic in form so as to render the rotor as light as possible consistent with strength and for the purpose of permitting oil to pass into the interior of the rotor.

As will be seen from Figure 3, the end walls 17 at the rim or periphery of the sections $a$ and $b$ are formed with an annular, laterally projecting flange or bead 18 which bears against the side wall 19 of the rotor casing 10, and the rotor sections are forced apart from each other by a series of transversely extending, coiled, expansion springs 20 which are illustrated as being supported at their ends on bosses 21 formed on the wall 17, but may be supported in any other way, and these springs act to urge the rotor sections away from each other so as to secure a gas-tight engagement between the beads 18 and the walls 19 of the rotor casing. The confronting faces of the rim 22 of the rotor sections $a$ and $b$ are formed, as shown in Figure 10, so as to have gas-tight sliding engagement with each other. This will be more fully described hereafter.

Extending radially from the sleeve-like hub sections 15 are the webs 23 which extend to the rim and the relatively wide webs 24 which are longitudinally recessed, as at 25, to receive the piston blades 26, these piston blades being formed in two sections, as illustrated in Figure 9, and urged away from each other by springs, as will be later described. These piston blades are recessed, as at 27, on their inner edge faces so as to form sockets for expansion springs 28 which urge these blades outward, and which at their inner ends bear against the hub sections 15 of the rotor. These piston blades 26, of course, bear at their outer ends against the inner face of the rotor casing 10 and at their ends bear against the end walls 19 of the rotor casing. Preferably, the rim of the rotor on each side of the recess 25 will be formed with recesses for the reception of packing strips 29 urged against the blade 26 by means of springs 30.

The rim of the rotor is increased in thickness at diametrically opposite points, that is at those points on the rim through which the piston blades 26 pass, as illustrated in Figure 2. That portion of this cam face, as it may be called, which is disposed immediately adjacent the opposite faces of the blade 26 and which is indicated by the letters $c$—$c$, has a curvature concentric to the axis of rotation of the rotor, and on one side of the blade 26 the periphery of the rotor curves gradually inward from the point $c$ to the point $d$, which is the thinnest portion of the rotor rim. The opposite side of the cam portion may be curved more steeply inward to merge into the periphery of the rim, as at $e$. These cam faces formed on the periphery of the rotor on each side of the piston blades 26 are for the purpose of forcing out the abutment blades 31 and 32 which are carried at diametrically opposite points of the rotor casing, as shown in Figure 2.

As illustrated in Figure 2, the lowest portion of the rotor casing is recessed, as at 33, to receive the transversely extending abutment blade 32, this blade on its inner edge face being formed with bores 34, and springs 35 being disposed within these bores and bearing against the end wall of the recess 33 so as to urge the abutment blade inward and into contact with the peripheral surface of the rotor. The inner face of the rotor casing is formed on each side of the recess 33, that is on each side of the abutment blade 32, with a cam-like portion 36 which is designed to engage and force inward the blades 26 just before they reach the blade 32. Disposed on one side of the blade 32 is the inlet port 37 to which a carbureter is connected by means of a pipe or other duct 38. On the opposite side of the blade 32 there is arranged the exhaust port 39 and connected to a pipe or duct 40 whereby the exhaust may be carried away. Both of these ports 37 and 39 at their ends have bridging webs 41, as shown in Figure 11, so that the pistons 26 will travel across the ports without any tendency to be forced into the ports and engage therewith, and impede the free movement of the rotor.

Diametrically opposite the abutment 32, the rotor casing is formed with an abutment recess 42 wherein the abutment blade 31 is disposed and has sliding engagement. This abutment blade is also bored for the reception of the spring 43, which forces the abutment inward and against the peripheral face of the rotor. This abutment recess is defined by a wall 44 which arches over the abutment recess. The head, which is formed as part of the rotor casing and which projects upwardly from the rotor casing, which head is designated generally 45, is formed to provide a combustion chamber 46 which extends approximately parallel to the wall 44 and between this combustion chamber and the wall 44 there is a water space 47 whereby to keep the abutment valve cooled and to insulate this abutment valve from the heat generated in the explosion chamber 46. Exteriorly of the explosion chamber 46, there is also provided a water jacket or chamber 48, and extending through this jacketed wall of the combustion chamber are the spark plugs 49.

As before stated, there are two combustion chambers disposed side by side, as shown most clearly in Figure 3, and each of these combustion chambers has therein preferably two spark plugs so as to secure an absolute certainty of explosion. Of course, this is a detail which may be varied, as any manner of igniting the spark might be used. Preferably, that portion of the rotor casing which extends from the outlet port of the combustion chamber to the abutment blade 32 will be formed with a water jacket or water space 50, as illustrated in Figure 2, as it is in this portion of the rotor casing that the greatest heat is generated. This temperature, of course, drops as soon as a piston blade 26 has passed the abutment valve or blade 32 and, therefore, there is no necessity of water jacketing or water cooling the opposite side of the rotor casing, and I have shown this opposite side as having a single wall, that is having no water space. Of course, the whole casing may be provided with cooling fins, pins or the like, but as this is an ordinary and well known construction, I have not considered it necessary to illustrate it.

The inlet to the combustion chamber is by way of a port 51 (see Figure 2) and the outlet from the combustion chamber into the rotor casing is by way of a port 52. These ports are bridged by transversely extending webs or ribs 53 so as to prevent the piston blades 26 from catching in these ports and prevent the slide valves controlling the inlet and outlet of the ignited gases from catching in these ports. These ports are in the form of long slots, one for each of the explosion chambers. Intersecting the entrance of each combustion chamber is an inlet valve casing formed by boring a cylindrical chamber in the wall of the rotor casing, this chamber extending tangentially to a circle whose center is the axis of the rotor. This bore or chamber, as illustrated in Figure 2, extends inward beyond the port 51, and disposed in this chamber is a piston valve 54 constructed in detail as illustrated in Figures 2, 5, 6 and 7. This valve is hollow and is formed with a head 55 at one end, and the body of the valve at a point rearward of its head end is longitudinally slotted for a portion of its length, as at 56, at diametrically opposite points, these slots extending longitudinally of the valve. The outer face of the valve is longitudinally grooved, as at 57, these grooves forming a continuation of the slot 56. This end of the valve is interiorly screw-threaded, as at 58, and normally closed by a screw-threaded plug 59 (see Figure 2). Disposed within the body of the valve is an approximately U-shaped yoke, shown in Figure 7 and designated generally 60, this yoke being formed to provide two legs joined by a transverse portion at one end. These legs extend rearward from the head end of the yoke, then project out laterally, as at 61, then extend rearwardly, as at 62, and then extend laterally outward, as at 63, these lateral extensions or lugs being perforated. This yoke is disposed within the valve, as shown in Figure 2, so that the portion 61 projects out through the slots 56 and the legs beyond the portion 61 are disposed in the grooves. These portions 62 lie within the grooves 57, and the lugs 63 are held to the end wall of the casing 10 by screws 64 and disposed within this yoke is a coiled expansion spring 65 which bears at one end against the head of the yoke and at its opposite end bears against the plug 54 which forms part of the cylindrical valve. Thus it will be obvious that the spring 65 acts to force or urge the valve outward. The valve is provided with two pairs of piston rings or valve rings 66, the pairs of rings being spaced from each other a distance greater than the width of the port 51 so that when the valve is in the position shown in Figure 2, the pairs of rings will be disposed on each side of the port 51 to thereby prevent loss of compression.

It will be, of course, obvious that there are two of these valves 54, one for each of the combustion chambers 46, and coacting with each valve is a cam 67, shown in Figure 2, these cams 67 being set in diametrically opposite relation to each other and being mounted upon a cam shaft 68. These cams are so constructed as to force the valves 51 inward and hold these valves in a closed position during ignition of the charge and while one of the piston blades is sweeping from a position where it uncovers port 52 to a position where it uncovers the exhaust port 39, or for any desired length of time. It will be noted at this time that the end of the piston valve is even with one wall of the explosion chamber so that the explosion comes against the end of the piston valve, the piston rings preventing the expanding gases from passing outward around the valve. The cam is so shaped, however, that as soon as full expansion of the ignited gases has been secured, the cam releases the valve, which is urged outwardly quickly by its spring 65 to open the port 51 and hold this port open during the time that the charge is being compressed in the combustion chamber.

It will be seen that the combustion chamber is relatively wide, though comparatively shallow, so that a complete charge of compressed fuel will be received within the combustion chamber. Of course, the shape of the cams 67 may be changed to secure any desired operation of the valves.

In Figures 12 and 13, I show an inlet valve of the same general character as that illustrated in Figures 5 to 7, but which does not have the internal spring but is positively moved outward and inward by a cam. This valve, which I have designated 54ª, is formed at its rear end with a yoke 69, and operating within this yoke is a cam 67ª, this cam and yoke being so formed that as the cam moves in the direction of the arrow in Figure 13, it will draw the valve outward by the engagement of the cam with the rear portion 70 of the yoke. Then when the valve has been drawn outward to its full extent, the face of the cam leaves the inner face of the part 70 and the cam rotates until the face of the cam engages with the end 71 of the valve and forces it inward. This construction also provides for a "dwell" of the cam when it is open and when it is closed.

The valve controlling the outlet of the ignited charge from the combustion chamber 46 into the rotor is designated 72. This valve, as illustrated in Figure 8, may be solid and is provided with two sets of piston rings 73 spaced from each other a distance greater than the width of the port 52 so that when the valve is shifted to close the port, these piston rings will lie on opposite sides of the valve and prevent the escape of compression. Each valve is urged inward to a position to close the port 52 by means of a cam 74, these cams being disposed upon a shaft 75. These cams are formed to provide for a rapid reciprocation of the valve and for a stoppage of the valve when it reaches its port closing position and when it reaches its port opening position. When the valve is in its closed position, that is has been forced fully inward the charge is being compressed within a combustion chamber, and at the time when the valve 51 has fully closed, the cam 74 rotates to such position that the valve 72 can begin to open. Then the pressure of the compressed charge on the inner end of the valve forces it outward against the face of the cam 74 and the valve continues to be forced open by this pressure until the valve begins to open the port 52. At approximately this instant, for example, the charge in the chamber 46 is ignited and the pressure generated in chamber 46 continues to open the valve 72, and when the valve has fully opened the port 53, the cam is in the position shown in Figure 2 and the valve is held open by the force of the charge. Of course, as soon as the port 52 is disclosed, the expanding gases expand into the rotor chamber and act against the blade 26, which at this moment has just passed the port 52, thus forcing the rotor in the direction of the arrow in Figure 2. This valve 72 remains open until the piston blade on that side has reached the port 39, when the valve is closed and the valve 51 open and a fresh charge is compressed within the combustion chamber 46.

It will be seen that the movement of either piston blade 26 away from the port 52 is caused by the explosion of the gases in chamber 46, and that this movement of the blade sucks out or scavenges the combustion chamber 46 of exhaust gases. It is also to be understood that the instant of ignition may be so regulated that ignition will occur after the port 52 has been fully opened, or it may occur before the valve 72 has even commenced to open the port 52, or it may occur when the port 52 is half open. This is secured by a proper adjustment of the timer or commutator 76 carried on shaft 75 and seen in Figure 1. This timer is of the usual construction and as it forms no part of my invention, need not be specifically described, it being merely stated that the shaft 75 carries the usual timer arm and contact 77 and that the cap or body 76 has the usual contact segments connected by wires to the ignition circuit and the spark plugs.

It will, of course, be understood that when one of the combustion chambers 46 is being filled with the charge and the charge compressed therein, the charge in the other combustion chamber is being fired. The cross section in Figure 4 illustrates the fact that the port 51, and this applies equally well to the port 52, has its side walls flared downwardly and laterally into the rotor chamber. The shafts 68 and 75 may be driven by any suitable means, but, of course, these shafts will have to be either driven from each other or from an intermediate driving shaft so that the valves shall move in unison, and I have illustrated for this purpose each of the shafts 68 and 75 as being provided with sprocket wheels 78, over which pass sprocket chains 79 leading to sprocket wheels 80 mounted on the shaft 16, as illustrated in Figure 3. I do not wish to be limited, however, to any particular means for driving the cam shafts.

Attention is called to Figure 2, wherein the contour of the outer wall of the rotor chamber is particularly illustrated. By reference to this figure, it will be seen that on the intake side of the rotor casing the inner face of the wall extends concentrically to the rotative axis of the rotor from the abutment 36 around to the point $f$, and that from there to the abutment blade or valve 31 the curvature of the wall is eccentric and that the inner surface of the wall becomes gradually nearer to the axis of the rotor until this inner surface intersects the groove 42. When one of the diametrically opposite, thickened portions of the rotor, therefore, reaches this point, the periphery of the rotor at this point will just clear the inner face of the rotor casing and the curved cam-like surface of the periphery of the rotor, as the rotor rotates, will act to gradually raise the abutment valve 31, while the inner surface of the rotor casing from the point $b$ to the intersection of groove 42 will act to gradually depress the blade 26 so that when the blades pass each other, the blade will be fully retracted and will have no tendency to bind on each other but will readily pass. The same is true when the blade 26 nears the valve or blade 32. Then the protuberant portions 36 will act to shift the blade 26 inward while the cam-like faces at diametrically opposite points on the rotor will force out the blade 32 so that the blades 32 and 26 will pass each other without difficulty.

In order to permit the immediate outward movement of the blade 26 after the blade has passed the abutment blade 31, the inner face of the rotor is inclined suddenly outward, as at $g$, (see Figure 2) and from thence around to the beginning of the portion 36, the inner face of the rotor casing on the closing side is concentric to the axis of the rotor.

It will be noted from Figure 2 that the cubical content of the space between the rotor and the rotor casing on the explosion side of the machine is less than the cubical content of the space between the rotor and the casing on the inlet side, thus securing the compression of a relatively large charge within the explosion chamber 46 and the concentration, as it might be called, of the exploding charge in a relatively smaller space behind one of the piston blades.

As before stated, the rotor is preferably formed in two sections, the two sections of the rotor being urged outward against the end walls 19 by means of the spring 20 in order to secure a gas-tight contact between the walls 19 and the rotor, and it is necessary, of course, that the joint between the two sections $a$ and $b$ of the rotor should be a gas-tight joint which shall permit the lateral movement of the sections $a$ and $b$. To this end, these two sections of the rim 22 of the rotor are formed as illustrated in Figure 10. The edge of one section, as for instance, the section $a$ is formed with an annular groove 81, and the opposite edge face of the section $b$ of the rim 22 is formed with a tongue 82 which fits into the groove 81, this tongue being grooved on opposite sides for the reception of packing strips 83. The upper wall of the groove 81 is formed to provide a plurality of laterally projecting tongues 84 projecting beyond the walls of the groove 81, and the face of the section $b$ is formed with a plurality of recesses 85 in which these tongues 84 engage. Thus, it will be obvious that when the two sections are engaged with each other, it is practically impossible for any gas to pass through the joint between the sections $a$ and $b$. Of course, it is also desirable to have the blades 26 made in two sections so that these sections will be forced against the inner faces of the walls 19. To this end, the pistons are constructed in two sections, as illustrated in Figure 3, these sections being connected by the joint shown in Figure 9, these sections being designated $a'$ and $b'$ respectively. The confronting ends of these sections are formed one with a groove 86 and the other with a tongue 87 engaging this tongue, and the section a' on each side of the tongue is formed with a series of recesses 88, while the end face of the section b' is formed with a series of tongues 89 on each side of the groove 86 fitting in these recesses 88. Springs 90 are disposed between the end face of the tongue and the end wall of the groove 86 and force these sections apart in opposite directions, thus forcing the ends of the blade against the walls 19. The same construction may be used for the blades 31 and 32.

Attention is particularly called to the fact that the curvature of the faces at the apices of the cam portions 39 of the rotor, that is the faces between the letters c—c, are concentric to the rotative axis of the rotor, and that the inner surface of the outer wall of the rotor casing on the inlet side of the abutment blade is also truly concentric so that when a piston blade reaches this portion of its stroke, it is forced fully inward and the face c—c of the rotor will come in close contact with the inner face of the rotor casing so that there is no pocketing of the charge at this point, but the whole charge is forced out through one or the other of the ports 51 and, therefore, there is no back pressure, due to pocketing of the charge between the inlet port 51 and the abutment blade.

For the purpose of lubricating the mechanism, allowing the rotor to be plentifully supplied with oil, the side walls 19 of the rotor casing are intended to be provided with an oil supply pipe, as at 93, so as to permit oil to be ejected into the space between the end of the rotor and the end wall of the rotor casing on one or both sides, the outer wall of this space being formed by the bead and the end walls of the rotor having openings of any suitable character so that the oil may pass freely through the rotor. The rotor casing is also provided at a suitable point with an outlet pipe 94 for the outlet of the lubricating fluid, and the rotor casing is designed to be connected to a suitable pump whereby oil may be caused to flow in a circuit through the rotor and between the rotor and the rotor casing. Of course, suitable means will be provided, if desired, for lubricating the piston valves, and it is obvious that the rotor casing will be so constructed that the ends may be separated from the annular body of the rotor so as to permit the rotor to be put in place and permit the abutment blades of the rotor casing to be put in place. Preferably the side wall of the abutment chamber 42 is provided with a spring actuated packing strip 92 bearing against the abutment, and the opposite face of this sliding abutment 31 is provided with a spring actuated packing strip 91 urged against the wall of the abutment chamber, as illustrated in Figure 2.

The operation of this mechanism will be obvious from what has gone before. The intake port of the rotor casing is connected to the carbureter or other source of fuel, and thus the charge is sucked into the rotor casing behind one of the rotor blades until the inlet side of the rotor casing is filled with the charge, the next succeeding blade acting to compress this charge and compress it within the explosion chamber. As soon as the charge has been compressed in one explosion chamber, the inlet valve of this chamber closes and as soon as the blade of the rotor has moved past the outlet port of the combustion chamber, the charge is ignited and the valve controlling the outlet opened, permitting the charge to act against the blade and force the rotor around. There is thus a charge being compressed and one charge always being fired.

Attention is called to the fact that this mechanism has been particularly designed so as to keep the valves controlling the inlet and outlet of gases from the explosion chamber from being overheated and from carbonizing, and that equal attention has been paid to preventing the abutment valve, which is disposed between the inlet and outlet ports of the combustion chamber, from being affected by the heat in the combustion chamber and to so insulate this blade and its spring that the spring which urges the blade against the rotor will not be affected by the heat and have its tension drawn. No springs are used for the purpose of actuating or shifting the valve controlling outlet from the combustion chamber for the same reason.

It will be noted that the travel of the piston blade is relatively small because of the fact that the piston blades move through protuberant portions which extend out approximately half the depth of the greatest space between the rotor and the rotor casing, and that the same is true of the abutments on each side of the abutment blades of the rotor casing.

I claim:—

1. A rotary internal combustion engine comprising a rotor casing having a combustion chamber formed with an inlet and outlet port leading into the rotor casing, an abutment blade disposed between the inlet and outlet ports and urged centrally, the rotor casing being formed with a fuel inlet port and a fuel outlet port and with an inwardly urged abutment blade disposed between the two ports, a rotor disposed within the casing having outwardly urged piston blades, the rotor casing on each side of the abutment blades being formed to cause the inward movement of the piston blades on the casing and permit their outward movement after the blades have passed the abutments, valves disposed on each side of the combustion chamber and controlling inlet and outlet through said inlet and outlet ports thereof, said valves having sliding movement into or out of their port closing position, means operated by the rotor for shifting said valves, and including a cam against which the inlet valve abuts, and means for urging the inlet valve outward, and a cam against which the outer end of the outlet valve abuts, said valve being urged outward by the explosion in the explosion chamber.

2. An internal combustion rotary engine including a rotor casing having two explosion chambers disposed side by side, each of the explosion chambers having an inlet and an outlet port leading into the interior of the rotor casing, the rotor casing being formed with an inwardly extending abutment between said ports, an abutment blade disposed between said ports and urged centrally, the diametrically opposite portion of the casing being provided with an inwardly projecting abutment, an inwardly urged abutment blade disposed therein, the rotor casing on each side of the last named abutment blade being formed with a fuel inlet port and an exhaust port, a shaft passing through the rotor casing, a rotor mounted upon the shaft and having grooves, piston blades disposed in said grooves and resiliently urged outward against the inner face of the casing, a pair of valves controlling the inlet of fuel to the explosion chamber through the inlet ports thereof, the valves being mounted for longitudinal sliding movement and urged outward to uncover said ports, oppositely disposed cams adapted in their rotation to alternately force said valves inward and permit the outward movement of the valves, a pair of sliding valves mounted in the rotor casing and controlling the outlet ports from the combustion chamber, said valves being urged outward by the expansion of the ignited gases within the combustion chamber, oppositely set cams acting to force the valves alternately inward to close the outlet ports from the combustion chamber, means for driving said cams, and means for igniting the charge alternately in the two combustion chambers.

3. An internal combustion rotary engine including a rotor casing having two explosion chambers disposed side by side, each of the explosion chambers having an inlet and an outlet port leading into the interior of the rotor casing, the rotor casing being formed with an inwardly extending abutment between said ports, an abutment blade disposed between said ports and urged centrally, the diametrically opposite portion of the casing being provided with an inwardly projecting abutment, an inwardly urged abutment blade disposed therein, the rotor casing on each side of the last named abutment blade being formed with a fuel inlet port and an exhaust port, a shaft passing through the rotor casing, a rotor mounted upon the shaft and having grooves, piston blades disposed in said grooves and resiliently urged outward against the inner face of the casing, a pair of valves mounted for sliding movement in the rotor casing, the inlet port and the combustion chamber being out of alignment with each other and the valves shifting across said inlet port to close the latter and to form one wall of the combustion chamber, mechanism acting to cause the reciprocation of said valves alternately in opposite directions, a pair of valves controlling the outlet ports from the combustion chambers, the outlet ports and the outlet ends of the combustion chambers being out of alignment with each other and said valves moving over the outlet ports and forming one end wall of the combustion chamber when the valves are closed, and means for causing the reciprocation of said valves in opposite directions, and means for igniting the charge alternately in one or the other of the combustion chambers when the inlet valve thereof is closed.

4. In an internal combustion rotary engine, a rotor casing having an inwardly extending abutment at one point in its circumference, the abutment being formed with a groove, an inwardly urged abutment blade mounted in said groove, the abutment being formed with a fuel inlet port on one side of said abutment and a fuel exhaust port on the opposite side of said abutment, the diametrically opposite portion of the rotor casing being formed with an inwardly extending abutment having a medially disposed groove, an outwardly urged abutment blade disposed in said groove, a pair of combustion chambers disposed side by side, U-shaped in section to extend inward on each side of the abutment and over the abutment blade, the abutment being formed to provide a water cooled space between the combustion chamber and the abutment blade, valve chambers formed in the rotor casing on each side of the last named abutment and extending tangentially inward from opposite sides of the rotor casing and intersecting the combustion chamber, the rotor casing being formed with two pairs of ports, one pair of ports leading into the inlet valve chambers and the other pair of ports leading from the outlet valve chambers, these ports being disposed out of alignment with the adjacent ends of the combustion chambers, piston valves controlling passage through said ports into the combustion chambers and operating in said valve chambers, means for reciprocating the intake valves alternately in opposite directions to alternately connect one or the other of the combustion chambers to their respective intake ports, piston valves in the opposite valve chambers and controlling outlet through the outlet ports of the combustion chamber, said valves when closed forming part of the outer wall of the combustion chamber and being urged outward by a pressure of the explosion in the combustion chambers, and means driven by the rotor alternately forcing one or the other of the outlet valves inward and permitting the other valve to move outward under the force of the explosion to uncover the corresponding outlet port leading into the casing, a shaft passing through the casing, and a bladed rotor mounted thereon.

5. In an internal combustion rotary engine, a rotor casing having an inwardly extending abutment at one point in its circumference, the abutment being formed with a groove, an inwardly urged abutment blade mounted in said groove, the abutment being formed with a fuel inlet port on one side of said abutment and a fuel exhaust port on the opposite side of said abutment, the diametrically opposite portion of the rotor casing being formed with an inwardly extending abutment having a medially disposed groove, an outwardly urged abutment blade disposed in said groove, a pair of combustion chambers disposed side by side, U-shaped in section to extend inward on each side of the abutment and over the abutment blade, the abutment being formed to provide a water cooled space between the combustion chamber and the abutment blade, valve chambers formed in the rotor casing on each side of the last named abutment and extending tangentially inward from opposite sides of the rotor casing and intersecting the combustion chamber, the rotor casing being formed with two pairs of ports, one pair of ports leading into the inlet valve chambers and the other pair of ports leading from the outlet valve chambers, these ports being disposed out of alignment with the adjacent ends of the combustion chambers, piston valves controlling passage through said ports into the combustion chambers and operating in said valve chambers, means for reciprocating the intake valves alternately in opposite directions to alternately connect one or the other of the combustion chambers to their respective intake ports, piston valves in the opposite valve chambers and controlling outlet through the outlet ports of the combustion chamber, said valves when closed forming part of the outer wall of the combustion chamber and being urged outward by a pressure of the explosion in the combustion chambers, and means driven by the rotor alternately forcing one or the other of the outlet valves inward and permitting the other valve to move outward under the force of the explosion to uncover the corresponding outlet port leading into the casing, a shaft passing through the casing, and a bladed rotor mounted thereon, the space between the rotor and the casing on the intake side of the rotor casing being larger than the space between the rotor casing and the rotor on the outlet side of the rotor casing.

6. In an internal combustion rotary engine having a rotor casing, a rotor therein formed in two lateral sections, the rotor having perforated end walls, the periphery of the rotor having laterally extending beads projecting beyond said end walls, the perforations in the end walls being disposed relatively adjacent the axis of the rotor and relatively remote from the beads, springs disposed within the rotor extending transversely thereof and urging the two sections of the rotor apart to force the annular beads on the end walls of the rotor in contact with the end walls of the rotor casing, the rotor casing being provided with means whereby lubricating oil may be discharged into the rotor casing and the rotor and withdrawn therefrom.

7. An internal combustion rotary engine including a rotor casing provided at diametrically opposite portions with inwardly projecting, transversely grooved abutments, spring projected abutment blades disposed in said abutments, one of said abutments having a fuel intake port on one side and a fuel exhaust port on the other side of the blade, the other abutment being formed with approximately U-shaped combustion chambers extending on opposite sides of the corresponding abutment blade, valve chambers opening into the ends of the combustion chambers, a pair of intake ports for said combustion chambers on one side of the last named abutment blade and opening into the corresponding valve chambers, a pair of outlet ports opening from the other pair of valve chambers into the rotor casing on the opposite side of said abutment, a pair of reciprocating valves on each side of the abutment and disposed in said valve chambers, means for alternately operating the valves to intermittently connect each of said combustion chambers with the interior of the rotor casing and intermittently connect the opposite end of the combustion chamber with the interior of the rotor casing, rotor operated means for operating said valves, a rotor disposed within the rotor casing, the rotor being formed at opposite portions in its diameter with outwardly protuberant, transversely grooved portions, outwardly urged piston blades disposed in said grooves, the rotor rotating constantly in one direction, the medial face of each protuberant portion of the rotor being concentric to the center of rotation of the rotor, the inner face of that portion of the second named abutment lying on the inlet side of the abutment blade for a distance being concentric to the center of the rotor whereby the protuberant portions of the rotor and said face of the second named abutment will coact to cause the inward movement of the respective abutment and piston blades into their respective grooves to permit the blades to pass each other.

In testimony whereof I hereunto affix my signature.

EARL E. BIDWELL.